US008996593B2

(12) United States Patent
Oba

(10) Patent No.: US 8,996,593 B2
(45) Date of Patent: Mar. 31, 2015

(54) FILE MANAGEMENT APPARATUS AND FILE MANAGEMENT METHOD

(75) Inventor: Mitsuharu Oba, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 525 days.

(21) Appl. No.: 13/218,484

(22) Filed: Aug. 26, 2011

(65) Prior Publication Data

US 2012/0110046 A1    May 3, 2012

(30) Foreign Application Priority Data

Oct. 27, 2010   (JP) ................. 2010-240278

(51) Int. Cl.
*G06F 12/00* (2006.01)
*G06F 17/30* (2006.01)

(52) U.S. Cl.
CPC .... *G06F 17/30115* (2013.01); *G06F 17/30235* (2013.01)
USPC ....................................... 707/831

(58) Field of Classification Search
None
See application file for complete search history.

(56) References Cited

U.S. PATENT DOCUMENTS

| 8,224,880 | B2 * | 7/2012 | Murotani et al. | 707/831 |
| 2004/0083224 | A1 * | 4/2004 | Yoshida | 707/100 |
| 2004/0193621 | A1 | 9/2004 | Moore et al. | |
| 2006/0101102 | A1 * | 5/2006 | Su et al. | 707/205 |
| 2008/0027940 | A1 * | 1/2008 | Canning et al. | 707/9 |
| 2008/0104063 | A1 | 5/2008 | Gallivan et al. | |
| 2009/0112881 | A1 * | 4/2009 | Kodama | 707/10 |
| 2010/0257218 | A1 * | 10/2010 | Vassilev et al. | 707/823 |
| 2011/0047192 | A1 * | 2/2011 | Utsunomiya | 707/809 |

FOREIGN PATENT DOCUMENTS

JP    2003-323326 A    11/2003

OTHER PUBLICATIONS

Hung Ba Ngo et al., Towards Ontology-based Semantic File Systems, Research, Innovation and Vision for the Future, 2007 IEEE International Conference, Mar. 1, 2007, 6 pp., XP031096977.
David K. Gifford et al., Semantic File Systems, Operating Systems Review, ACM, Jan. 1, 1991, 10 pp., vol. 25, No. 5, New York, NY, US, XP000288299.
T. Koyama, Composite Term Extraction for Japanese Texts, Journal of Japan Society of Information and Knowledge, vol. 19, No. 4, pp. 306-315, 2009.

* cited by examiner

*Primary Examiner* — Robert Beausoliel, Jr.
*Assistant Examiner* — Michael Pham
(74) *Attorney, Agent, or Firm* — Mattingly & Malur, P.C.

(57) ABSTRACT

In order to make more efficient virtual folder creation work which is required at the time of virtually classifying files, the present invention provides a system having: a function of extracting keywords and frequencies thereof included in metadata; and a function of creating a virtual folder on the basis of the extracted keywords and the extracted frequencies thereof. At the time of extracting the keywords, character strings which can be considered as the keywords are comprehensively extracted. In addition, at the time of creating the virtual folder, the virtual folder is provided with a hierarchical structure including at least two hierarchical levels of a parent folder and a child folder. At the time of creating the child folder, in the case where child folder candidates having equivalent frequencies exist, a candidate having a longer character string is adopted.

12 Claims, 10 Drawing Sheets

FIG. 2

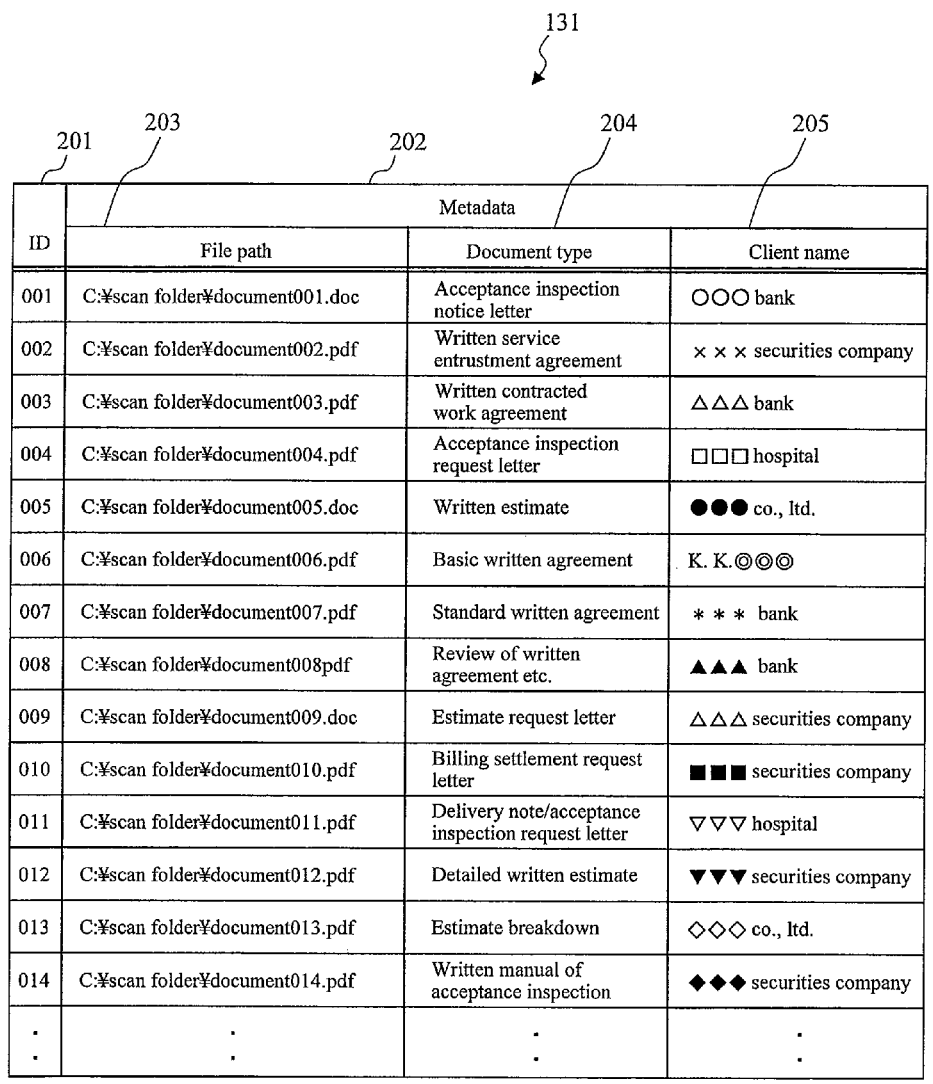

| ID | File path | Document type | Client name |
|---|---|---|---|
| | | Metadata | |
| 001 | C:¥scan folder¥document001.doc | Acceptance inspection notice letter | ○○○ bank |
| 002 | C:¥scan folder¥document002.pdf | Written service entrustment agreement | × × × securities company |
| 003 | C:¥scan folder¥document003.pdf | Written contracted work agreement | △△△ bank |
| 004 | C:¥scan folder¥document004.pdf | Acceptance inspection request letter | □□□ hospital |
| 005 | C:¥scan folder¥document005.doc | Written estimate | ●●● co., ltd. |
| 006 | C:¥scan folder¥document006.pdf | Basic written agreement | K. K.◎◎◎ |
| 007 | C:¥scan folder¥document007.pdf | Standard written agreement | ＊＊＊ bank |
| 008 | C:¥scan folder¥document008pdf | Review of written agreement etc. | ▲▲▲ bank |
| 009 | C:¥scan folder¥document009.doc | Estimate request letter | △△△ securities company |
| 010 | C:¥scan folder¥document010.pdf | Billing settlement request letter | ■■■ securities company |
| 011 | C:¥scan folder¥document011.pdf | Delivery note/acceptance inspection request letter | ▽▽▽ hospital |
| 012 | C:¥scan folder¥document012.pdf | Detailed written estimate | ▼▼▼ securities company |
| 013 | C:¥scan folder¥document013.pdf | Estimate breakdown | ◇◇◇ co., ltd. |
| 014 | C:¥scan folder¥document014.pdf | Written manual of acceptance inspection | ◆◆◆ securities company |
| ⋮ | ⋮ | ⋮ | ⋮ |

FIG. 3

Attribute: Document type

| Keyword | Frequency |
|---|---|
| Acceptance inspection | 292 |
| Notice | 227 |
| Letter | 350 |
| Acceptance inspection notice | 110 |
| Notice letter | 212 |
| Acceptance inspection notice letter | 113 |
| Service | 212 |
| Entrustment | 237 |
| Agreement | 318 |
| Service entrustment | 187 |
| Written service entrustment agreement | 84 |
| Contracted work | 89 |
| Contracted work agreement | 59 |
| Written contracted work agreement | 57 |
| Acceptance inspection request | 112 |
| Acceptance inspection request letter | 108 |
| Contracted work agreement | 59 |
| Written contracted work agreement | 57 |
| . . . | . . . |

FIG. 4

| | 133 |
|---|---|

| Attribute: document type | |
|---|---|
| Parent folder | Child folder |
| Agreement | Written agreement |
| Agreement | Written entrustment agreement |
| Agreement | Written service entrustment agreement |
| Agreement | Written manufacturing entrustment agreement |
| Agreement | Written contracted work agreement |
| Agreement | Written maintenance agreement |
| Agreement | Written confidentiality agreement |
| Agreement | Written purchase and sale agreement |
| Entrustment | Written entrustment agreement |
| Entrustment | Service entrustment |
| Entrustment | Management entrustment |
| Entrustment | Written explanation of entrustment contents |
| Estimate | Written estimate |
| Estimate | Estimate request letter |
| Estimate | Estimate template |

FIG. 8A

| Character string | Acceptance inspection | Notice | Letter | 1 |
|---|---|---|---|---|
| Part of speech | Noun - joined to irregular conjugation of "suru" verbs | Noun - joined to irregular conjugation of "suru" verbs | Noun - suffix - general | Unknown word |

FIG. 8B

| Keyword |
|---|
| Acceptance inspection |
| Notice |
| Letter |
| 1 |
| Acceptance inspection notice |
| Notice letter |
| Letter 1 |
| Acceptance inspection notice letter |
| Notice letter 1 |
| Acceptance inspection notice letter 1 |

FIG. 8C

| Keyword |
|---|
| Acceptance inspection |
| Notice |
| Letter |
| Acceptance inspection notice |
| Notice letter |
| Acceptance inspection notice letter |

FILE MANAGEMENT APPARATUS AND FILE MANAGEMENT METHOD

BACKGROUND OF THE INVENTION

1. Field of the Invention

The present invention relates to a file management apparatus and a file management method, and relates to, for example, a technology for virtually classifying files on a computer.

2. Background Art

In recent years, along with development of a computer, a plurality of users share a file with one another on a daily basis through a plurality of computers connected via a network. For example, there is a case where a file on a file server is shared by a plurality of users. At the time of managing a file, it is general to employ a folder (physical folder) with a fixed hierarchical structure. At the time of storing a file, there is a case where the file is stored into a folder which is decided according to operational rules inside of an organization. According to the operational rules, for example, a file is stored into a decided folder for each file type or for each user's department. Further, it is possible to conceive various patterns such as creating a folder for each year in which each file is created and creating a folder for each product. Such folder management methods are adopted not only in the case where a plurality of users share a file with one another but also in the case where a single user manages a file.

Depending on contents of work of a user, there is a case where some files stored in a plurality of physical folders need to be used collectively for one intended purpose. In such a case, for example, it is necessary to find out a required file from each folder and copy the file into one folder, so that this work places a burden on the user. In addition, when such work is repeated, the number of the same files increases on the file server, and a larger capacity of the file server is occupied. Further, if only part of the files thereamong are changed, similar files exist in a scattered manner on the file server, so that there arises a problem that the latest file cannot be determined.

In view of the above, there has been devised a method of managing a document (file) in association with metadata (attribute information) of the document. For example, JP Patent Publication (Kokai) No. 2003-323326 A has proposed a virtual folder system. The virtual folder system refers to a system which provides a folder (virtual folder) for storing a file or a folder which satisfies conditions, irrespective of the location at which the file actually exists. For example, metadata is set to files, and retrieval conditions on the metadata are defined to a virtual folder, whereby files which satisfy the retrieval conditions can be stored into the virtual folder. When the virtual folder is referred to, only the files based on the retrieval conditions are displayed. For example, in the case of managing a sales document, first, a "document type" (a written agreement (contract document), an order form, a written estimate, and the like) is defined as an attribute. The attribute refers to, for example, a term which represents a type of metadata such as a "document type" and a "business partner". The document type is given to all files, and the retrieval condition that "the document type is "written agreement (contract document)"" is assigned to a virtual folder, whereby a list of written agreements (contract documents) can be acquired by referring to the virtual folder. In this way, in the virtual folder system, files are semantically classified, and hence effective utilization of documents becomes possible. In addition, files can be virtually managed by various folders irrespective of a physical folder structure, and hence it is possible to solve problems that a larger capacity is occupied by meaninglessly copying a file and the latest version cannot be determined.

SUMMARY OF THE INVENTION

However, according to the technology of JP Patent Publication (Kokai) No. 2003-323326 A, a user needs to give a definition of the virtual folder, and this work places a burden on the user. In addition, the user also needs to consider on the basis of what criterion files are to be classified. In order to do this work, the user needs to be aware of what files exist on the file server and judge on the basis of what point of view the files are to be classified. In general, there is difficulty in being aware of contents of the entire file server and appropriately classifying the files.

The present invention has been made in view of the above-mentioned circumstances, and therefore provides a technology of applying metadata such as a document type and a file name to files stored on a file server, to thereby automatically perform virtual classification.

In order to achieve the above-mentioned object, the present invention provides a file management apparatus which creates a virtual folder for virtually classifying files. This apparatus extracts keywords from character strings constituting metadata of the files, and registers the extracted keywords into a storage region. In addition, this apparatus automatically decides conditions of a file to be stored into the virtual folder on the basis of a keyword having a high appearance frequency in a group of pieces of metadata employed for creating the virtual folder.

That is, the file management apparatus according to the present invention includes: a processor which executes a program which creates a virtual folder for classifying a plurality of physical files; and a storage apparatus which stores therein metadata management information for managing metadata of the plurality of physical files. Here, the virtual folder is a virtual folder for managing link information of the plurality of physical files and a plurality of physical folders, irrespective of locations at which one of the plurality of physical files and the plurality of physical folders exist, the plurality of physical folders storing therein the physical files.

First, the processor extracts a plurality of keywords from character strings constituting the metadata of the plurality of physical files of the metadata management information, and acquires information on an appearance frequency of each of the extracted keywords. Then, the processor employs a keyword having the appearance frequency which is equal to or higher than a predetermined value, to thereby create a prescribed number of virtual higher-level folders. Further, the processor employs another keyword including the keyword employed for creating the virtual higher-level folders, to thereby create virtual lower-level folders which are associated with the virtual higher-level folders. Still further, the processor outputs virtual classification display which displays a relation between the created virtual higher-level folders and the created virtual lower-level folders and contents of the virtual higher-level folders and the virtual lower-level folders.

According to the present invention, it is possible to automatically create a virtual folder for retrieving a group of files stored on a file server. As a result, even a user who does not know much about contents of the files stored on the file server can make a virtual folder in reduced man-hours of work.

It should be noted that problems to be solved, configurations, and effects other than those described above will

BRIEF DESCRIPTION OF THE DRAWINGS

FIG. 2 is a diagram illustrating an example of a metadata file.

FIG. 3 is a diagram illustrating an example of keyword data.

FIG. 4 is a diagram illustrating an example of virtual folder data.

FIGS. 8A to 8C are diagrams each illustrating an example of data which is used in the keyword extraction process.

DETAILED DESCRIPTION OF THE PREFERRED EMBODIMENT

Figure 1:
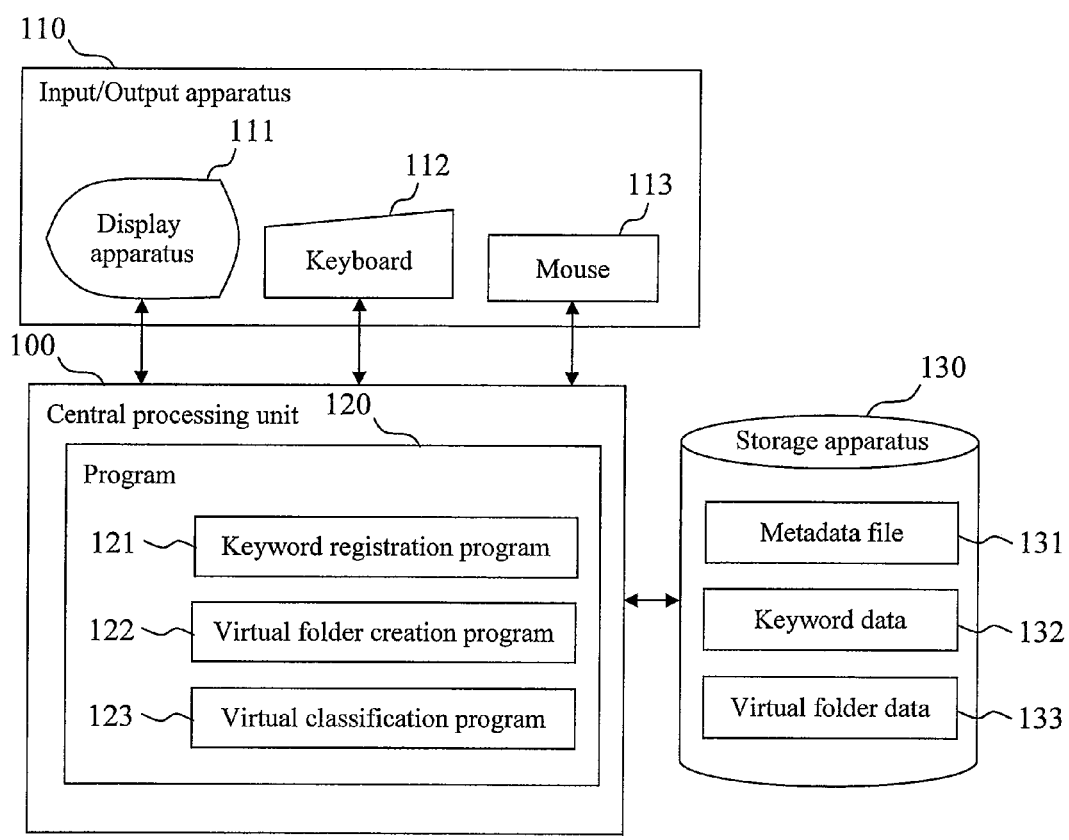
FIG. 1 is a diagram illustrating a schematic configuration of a system (file management apparatus) according to an embodiment of the present invention.

Hereinafter, an embodiment of the present invention is described with reference to the attached drawings. Is should be noted that the present embodiment is merely an example for realizing the present invention, and thus does not limit a technical range of the present invention. In addition, the same reference numerals are given to elements common to the respective figures.

It should be noted that, although pieces of information of the present invention are described in the form of a table in the following description, these pieces of information do not necessarily need to be expressed by a data structure in the form of a table, and thus may be expressed by data structures of a list, a DB, a queue, and the like or other structures. Therefore, in order to clarify that how to express each piece of information is independent of the data structure, a "table", a "list", a "DB", a "queue", and the like may be simply referred to as "information".

In addition, at the time of describing contents of each piece of information, it is possible to employ expressions of "identification information", an "identifier", a "name", a "appellation", and an "ID", and these expressions can be replaced with each other.

The following description is given with a "program" being a subject, but when the program is executed by a processor, the program performs a given process while employing a memory and a communication port (communication control apparatus), and hence the following description may be regarded as description with the processor being a subject. In addition, the process which is disclosed with the program being a subject may be regarded as a process performed by a calculator or an information processing apparatus of a management server and the like. A part or entirety of the program may be implemented by dedicated hardware or may be modularized. Various programs may be installed into each calculator by a program distribution server or a storage medium.

<Configuration of Virtual Classification Apparatus>

FIG. 1 is a functional block diagram illustrating a schematic configuration of a virtual classification apparatus (which may also be referred to as a file management apparatus and a document processing apparatus) according to the embodiment of the present invention. The virtual classification apparatus includes: a central processing unit (processor) 100 which performs a necessary arithmetic process, a necessary control process, and the like; an input/output apparatus 110 which serves to input and output data; a program memory 120 which stores therein programs necessary for the processes by the central processing unit 100; and a storage apparatus 130 which stores therein data to be processed by the central processing unit 100 or data after the process.

The input/output apparatus 110 includes: an output device including a display apparatus 111 which serves to display data, a printer (not shown), and the like; a keyboard 112 which serves to perform an operation of selecting a menu on the displayed data; and a pointing device 113 such as a mouse.

The program memory 120 stores therein: a keyword registration program 121 which extracts a keyword from metadata; a virtual folder creation program 122 which creates a virtual folder on the basis of the keyword; and a virtual classification program 123 which displays the virtual folder on a screen and displays contents of files stored in each virtual folder. It should be noted that the respective processing programs are stored as program codes in the program memory 120 and are implemented when the central processing unit 100 executes the respective program codes.

The storage apparatus 130 stores therein: a metadata file 131 of each file; keyword data 132 in which a keyword which is extracted from among character strings constituting metadata is stored; and virtual folder data 133 in which definition information of a virtual folder which is created on the basis of the keyword is stored. It should be noted that the storage apparatus 130 may be a storage system which is remotely placed via a network.

The processing programs, the pieces of data, the respective programs, and the like described above can also be provided while being stored in various recording media such as a CD-ROM, a DVD-ROM, an MO, a floppy (registered trademark) disk, and a USB memory.

<Metadata>

FIG. 2 is a diagram illustrating an example of the metadata file 131 included in the storage apparatus 130. In the embodiment of the present invention, it is assumed that respective files (files 001, 002, 003, . . . ) registered in the metadata file 131 are managed together with the metadata 202 inside of the metadata file 131. Accordingly, it is assumed that a file for which the metadata 202 is not registered is not registered here.

The metadata file 131 is managed, for example, in the form of a table, and one file corresponds to one line. The metadata file 131 includes, as constituent items thereof: an ID 201 which uniquely indicates each file; and the metadata 202 registered for each file.

In the metadata 202, columns are formed for each attribute managed by this system. FIG. 2 illustrates, for example, metadata of files which are obtained by scanning a paper sales document using a scanner. In the example of FIG. 2, there are a file path 203, a document type 204, and a client name 205 of a file as attributes. It should be noted that various patterns other than those illustrated in FIG. 2 can be conceived as the metadata. For example, it is possible to conceive: metadata on dates such as an access date and a last modified date of a file; and metadata on persons who creates or modifies a file.

<Keyword Data>

FIG. 3 is a diagram illustrating an example of the keyword data 132 included in the storage apparatus 130. The keyword data 132 is data in which a characteristic word (keyword) 301 and an appearance frequency 302 of the keyword 301 are written on the basis of character string information in the metadata file 131. The appearance frequency 302 represents the number of files including the corresponding keyword in the metadata file 131 included in the storage apparatus 130. The example of FIG. 3 shows that the number of files including the keyword "acceptance inspection" among the files registered in the metadata file 131 is 292.

It should be noted that the keyword data 132 includes a plurality of registration information files, for example, for each attribute.

<Virtual Folder Data>

FIG. 4 is a diagram illustrating an example of the virtual folder data 133 included in the storage apparatus 130. The virtual folder data 133 is data which is created on an attribute basis and in which a definition of a virtual folder created by a virtual folder creation program to be described later is written. Here, the virtual folder refers to a folder which stores therein a file or a folder which satisfies conditions, irrespective of the locations at which the file and the folder (the physical file and the physical folder) actually exist. In addition, the virtual folder does not store therein a physical body of the file or the folder but stores therein one or a plurality of shortcuts thereof. Then, in the case where the physical file/folder is changed, newly created, or deleted, the result is reflected in the virtual folder, so that contents of the virtual folder are changed. It should be noted that the virtual folder is based on a concept which is different from a mere shortcut and a mere alias. More specifically, the shortcut of a file is not a folder, and hence a plurality of files cannot be placed together therein. The shortcut of a folder serves to merely enable a physical folder to be referred to from another location. In addition, the alias is substantially synonymous with the shortcut, and is a technology of enabling reference from another location with another name. Both of the shortcut and the alias are not intended to store a file (folder) which satisfies conditions.

FIG. 4 illustrates an example in which the attribute is a document type and a virtual folder including two hierarchical levels of a parent folder 401 and a child folder 402 is illustrated. The parent folder 401 is defined by a keyword which encompasses contents of the child folder 402. The child folder 402 is defined by a keyword which further details contents of the parent folder 401, and is constituted by a character string including the keyword of the parent folder 401.

It should be noted that the virtual folder data 133 may be automatically created after an instruction to execute a virtual classification process is inputted, may be automatically created at a time point at which a predetermined number of files are accumulated, or may be automatically created for files which are accumulated at a predetermined time interval. In addition, at the time of creating the virtual folder data 133, a user may designate a keyword to be employed for folder creation.

<Virtual Classification Screen>

Figure 5:
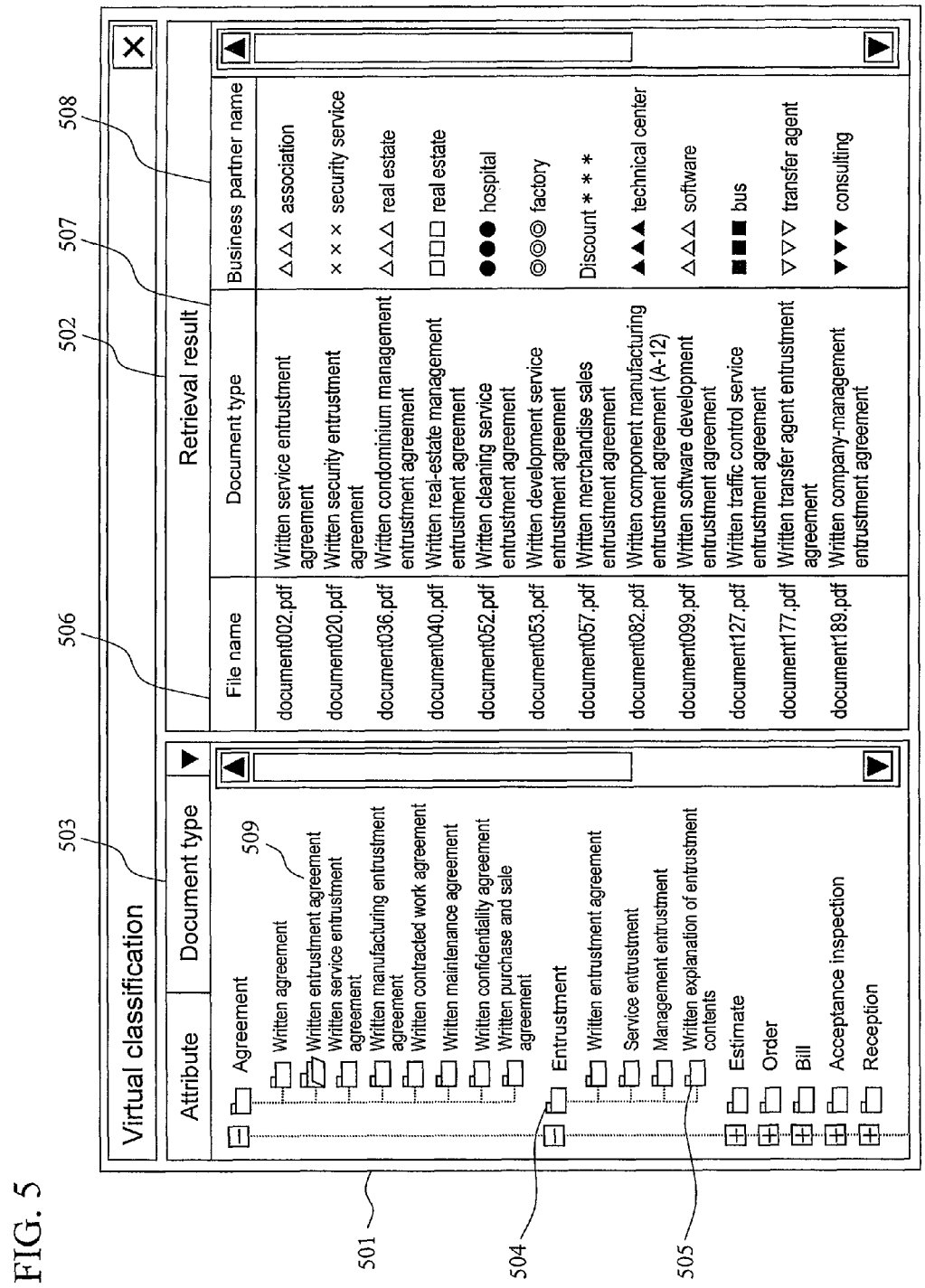
FIG. 5 is a diagram illustrating an example of a virtual classification screen.

FIG. 5 is a diagram illustrating an example of a display screen (GUI) of virtual classification created by the virtual classification program 123. As illustrated in FIG. 5, on the GUI window, a tree view 501 of virtual folders is displayed in the left pane, and a retrieval result 502 of files stored in a selected virtual folder is displayed in the right pane.

At the time of displaying the virtual folder on the GUI screen, the virtual classification program 123 uses the virtual folder data 133 included in the storage apparatus 130. In addition, at the time of displaying the retrieval result, the virtual classification program 123 uses the metadata file 131 included in the storage apparatus 130.

A pull-down menu 503 for selecting an attribute is displayed in the left pane on the GUI window, and virtual folders having the selected attribute are displayed in a structure including parent folders 504 and child folders 505. At this time, only attributes for which the virtual folder is defined can be selected from the pull-down menu 503. Files having metadata including a character string constituting the virtual folder in the selected attribute are displayed in the retrieval result 502. On this occasion, metadata of the corresponding files is displayed.

FIG. 5 illustrates a state where the attribute "document type" is selected and "written entrustment agreement" of a child folder in "agreement" of a parent folder is selected. Files including "written entrustment agreement" in the attribute "document type" are displayed in the retrieval result 502. In addition, metadata of attributes such as a file name 506, a document type 507, and a business partner name 508 is displayed therein. Further, when a parent folder is selected, files including a character string constituting the parent folder are displayed in the retrieval result. When a file in the retrieval result is selected by a user, an application associated with the selected file is activated by the operating system, and this file is opened.

For example, the user interface (GUI) as illustrated in FIG. 5 is displayed by the virtual classification process, and the use of the GUI thus displayed enables a user to refer to files stored in physically different folders for each virtual folder. Then, the user can refer to the files according to semantic classification without the need to consider the physical folders in which physical bodies of the files are stored. In addition, it is also possible for the user to select an attribute on the GUI, and different virtual folder trees are configured for each attribute, to thereby enable the user to retrieve a file from a point of view desired for the retrieval.

<Outline of Processes by Document Processing Apparatus>

The processes performed by the document processing apparatus having the above-mentioned configuration are described. First, the central processing unit 100 employs the keyword registration program 121, reads the metadata file 131 included in the storage apparatus 130, extracts a characteristic word (keyword) from the metadata file 131, and stores the extracted keyword as the keyword data 132 (see FIG. 3) into the storage apparatus 130.

Next, the virtual folder creation program 122 is executed. The virtual folder creation program 122 reads the keyword data 132 from the storage apparatus 130, creates definition information of a virtual folder on the basis of characteristics of the keyword, and stores the created definition information as the virtual folder data 133 (see FIG. 4) into the storage apparatus 130.

Subsequently, the virtual classification program 123 is executed. The virtual classification program 123 reads the metadata file 131 and the virtual folder data 133 from the storage apparatus 130, and displays the virtual folders (see FIG. 5) on the basis of the definition of the virtual folders written in the virtual folder data 133. Then, the virtual classification program 123 receives an input from a user, and retrieves, when a virtual folder is selected, files stored in the virtual folder from the metadata file 131 to display the corresponding files. The respective processes are described below in detail.

<Keyword Registration Process>

Figure 6:
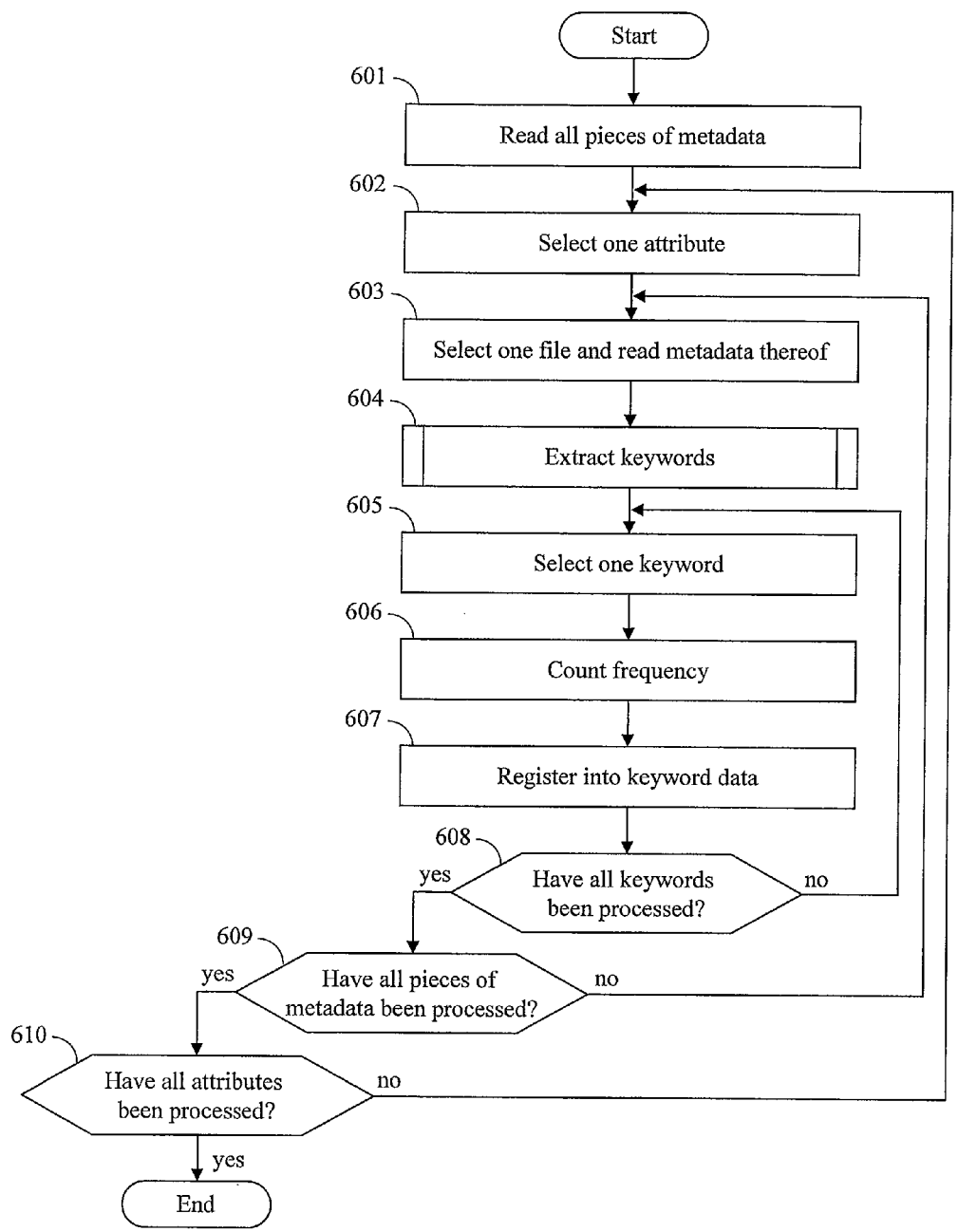
FIG. 6 is a flow chart for describing a keyword registration process.

FIG. 6 is a flow chart for describing a keyword registration process executed by the keyword registration program 121. In the keyword registration process, a keyword and the frequency thereof are extracted from the metadata file 131 as illustrated in FIG. 2, and the keyword data 132 as illustrated in FIG. 3 is outputted. The operations in this process are chiefly performed by the keyword registration program 121.

In Step 601, the keyword registration program 121 reads all the metadata files 131 from the storage apparatus 130. It should be noted that the keyword registration program 121 does not necessarily need to read a metadata file having an attribute for which a virtual folder does not need to be created.

In Step 602, the keyword registration program 121 selects one attribute from among the read metadata files. The following process from Step 603 to Step 609 is performed on the attribute selected in Step 602. It should be noted that, when the keyword registration program 121 selects an attribute, the selection target does not need to be all attributes but may be only a part of the attributes.

In Step 603, the keyword registration program 121 reads one piece of data having the attribute selected in Step 602 from among the metadata files read in Step 601. For example, discussed is the case where data in which a value of the attribute "document type" is "acceptance inspection notice letter" is read.

In Step 604, the keyword registration program 121 extracts keywords included in the data read in Step 603. Here, the keyword refers to a group of words which is included in a character string and has a noun function. For example, the character string of "acceptance inspection notice letter" includes six patterns of keywords, that is, "acceptance inspection", "notice", "letter", "acceptance inspection notice", "notice letter", and "acceptance inspection notice letter". Here, the extraction target is the title of a document but may be the character string in a client name or a text document included in the document. In Step 604, a process of extracting such keywords from the character string is performed. Various existing technologies can be applied to the method of extracting keywords. According to a representative technology, for example, morphological analysis is performed on a target character string of the keyword extraction, and a term which is obtained by joining extracted words in accordance with the type of the part of speech thereof is regarded as a keyword (for example, Teruo KOYAMA, "Composite Term Extraction from Japanese Texts", Journal of Japan Society of Information and Knowledge, vol. 19, No. 4, pp. 306 to 315, 2010). According to this method, basically, a character string in which one or more nouns are continued is regarded as a keyword, and this method is generally frequently employed. There have also been proposed a large number of technologies of analyzing extracted keywords further in detail, to thereby increase the extraction accuracy of the keywords. In the present embodiment, such keyword extraction technologies are employed. The detail of a keyword extraction process will be described later with reference to FIGS. 7 and 8.

In Step 605, the keyword registration program 121 selects one of the keywords extracted in the keyword extraction process (Step 604).

In Step 606, the keyword registration program 121 counts the frequency at which the selected keyword appears in the data having the attribute selected in Step 602, in the data read in Step 601. More specifically, the keyword registration program 121 counts the number of times the selected keyword partially matches in the target data.

In Step 607, the keyword registration program 121 stores data on the keyword and the frequency thereof into the keyword data 132 of the storage apparatus 130.

In Step 608 to Step 610, the keyword registration program 121 performs a process loop from Step 602 to Step 607.

FIG. 3 illustrates an example of the keyword data 132 thus obtained. In FIG. 3, keywords whose attribute is the document type and the frequencies thereof are illustrated, and similar data is created also for other attributes.

<Detail of Keyword Extraction Process>

Figure 7:
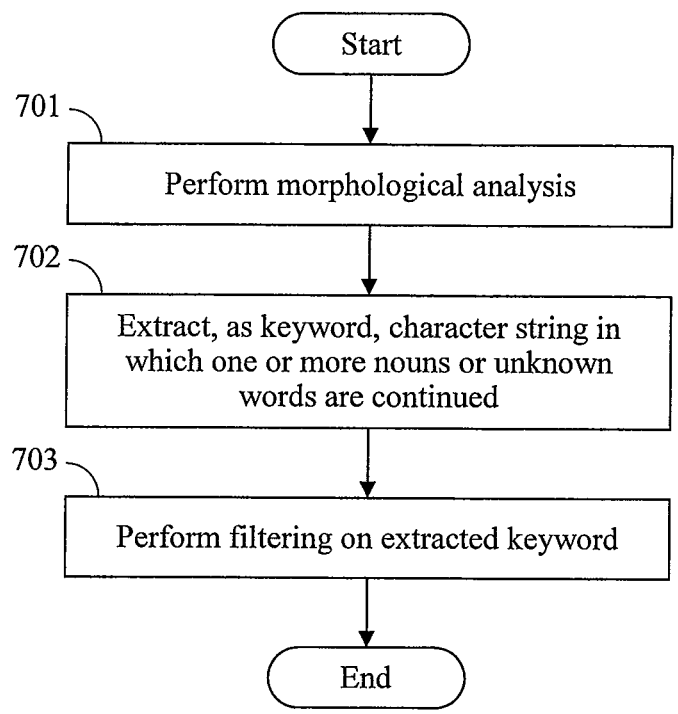
FIG. 7 is a flow chart for describing a keyword extraction process.

FIG. 7 is a flow chart for describing the detail of the keyword extraction process (Step 604), and FIGS. 8A to 8C are schematic diagrams each illustrating a specific example of the keyword extraction process.

In the keyword extraction process, first in Step 701, the keyword registration program 121 performs morphological analysis on a character string to be processed. The morphological analysis refers to a process of employing a dictionary with information such as parts of speech, the grammar, and the like as an information source and dividing a sentence written in a natural language into morpheme lines, to thereby determine the part of speech. FIG. 8A illustrates results which are obtained by performing the morphological analysis on the character string of "acceptance inspection notice letter 1". The character string of "acceptance inspection notice letter 1" is divided into four character strings of "acceptance inspection", "notice", "letter", and "1". In addition, in the line of the part of speech, that each character string is a noun or an unknown word is illustrated together with accessory contents. The unknown word refers to a character string whose part of speech is determined to be unknown as a result of the morphological analysis. In the morphological analysis, the part of speech of an inputted character string is determined on the basis of an internally used dictionary, and hence a character string which is not registered in the dictionary is determined as an unknown word. Specifically, proper nouns such as a product name and an individual name can be unknown words. In addition, the morphological analysis is intended to be utilized for analysis of Japanese, and hence there is a case where alphanumeric characters, symbols, and the like are not registered in the dictionary. In the above-mentioned example, the case where "1" is determined as an unknown word is described. In Step 702, a character string in which one or more nouns or unknown words are continued is extracted by utilizing information on the part of speech of each character string. Meanwhile, if a character string comprises an adjective phrase and one or more nouns, such as "written agreement," "written explanation of entrustment contents," "written purchase and sales agreement," and so on, the character string can also be extracted by utilizing information on the part of speech of each character string.

In Step 702, the unknown words are actually nouns in many cases, and hence the keyword registration program 121 regards the unknown words as part of the character string constituting the keyword, together with the nouns. FIG. 8B illustrates results which are obtained by performing the process of Step 702 on "acceptance inspection notice letter 1". Ten patterns of character strings are registered as keywords.

In Step 703, the keyword registration program 121 performs filtering on the extracted keywords. In a virtual folder creation process executed by the virtual folder creation program 122, the virtual folder is created on the basis of the extracted keywords, and hence if a keyword inappropriate for the virtual folder is included, an inappropriate virtual folder may be created. Therefore, a keyword which is considered to be inappropriate for the virtual folder is excluded in this process. For example, in the case where the virtual folder is defined on the basis of the keyword of "acceptance inspection notice letter 1", it is considered to be desirable to exclude a number, from the point of view of the simplicity in classification for a user. It should be noted that, in order to realize the filtering, characters to be excluded and particular nouns are registered in advance in a dictionary or a DB, and whether or not a target character is to be excluded is determined by referring to the dictionary or the DB. Examples of the characters to be excluded include: symbols such as an asterisk and an arrow; and numbers (note that the numbers may be necessary as keywords in some cases, and hence it is inappropriate to always exclude the numbers. Accordingly, a user may be finally asked whether or not the numbers are to be excluded). FIG. 8C illustrates an example in which keywords including a number are excluded from the keywords in FIG. 8B. In addition, nouns having a particular pattern should also be excluded. Examples of such particular nouns include: pronouns; stems of "nai" adjectives (corresponding to adjectives with a negative prefix in English); and part of noun suffixes. The stems of "nai" adjectives refer to nouns which take the form of "-nai", for example, "moshiwake" ("moshiwake-nai" corresponds to "no excuse" in English) and "otonage" ("otonage-nai" corresponds to "immature" in English). In addition, examples of the noun suffixes to be excluded include: honorific titles following personal names such as " . . . kun" (corresponding to "Mr." in English) and " . . . son" (corresponding to "Ms."); and stems of adjective verbs such as "gachi" of "yasumi-gachi" (corresponding to "tend to be absent" in English) and "dozen" of "kattamo-dozen" (corresponding to "as good as won").

<Virtual Folder Creation Process>

Figure 9:
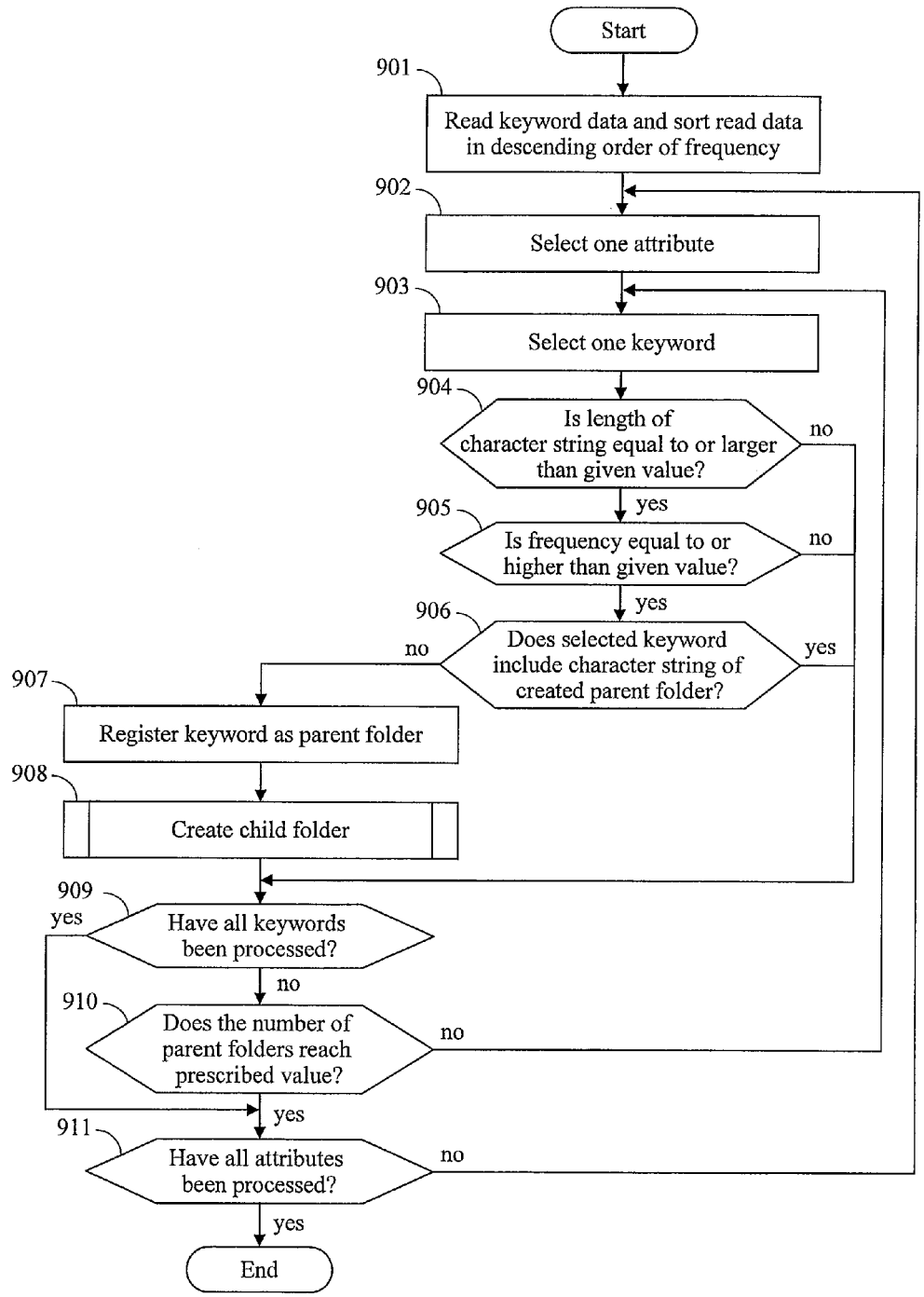
FIG. 9 is a flow chart for describing a virtual folder creation process.

FIG. 9 is a flow chart for describing the virtual folder creation process executed by the virtual folder creation program 122. In the virtual folder creation process, the virtual folder data 133 is created by employing the keyword data 132 obtained in the keyword extraction process. The operations in this process are chiefly performed by the virtual folder creation program 122.

In Step 901, the virtual folder creation program 122 reads the keyword data 132 from the storage apparatus 130 and sorts the read data in descending order of the frequency. The virtual folder creation program 122 creates a parent folder as a virtual folder (hereinafter, referred to as parent folder in some cases) in descending order of the frequency while sorting the read data in descending order of the frequency. At the time at which the number of parent folders reaches a prescribed value, the virtual folder creation program 122 ends the process. As a result, there is a case where the need to process a keyword having a low appearance frequency is eliminated, and in this case, the processing speed is enhanced.

In Step 902, the virtual folder creation program 122 selects one attribute stored in the keyword data 132.

In Step 903, the virtual folder creation program 122 selects one keyword having the selected attribute.

In a process from Step 904 to Step 906, the virtual folder creation program 122 selects a keyword which should be registered as the parent folder. In Step 904, the virtual folder creation program 122 determines whether or not the length of the character string of the selected keyword is equal to or larger than a given value. This is because, if the length of the character string is extremely small, classification granularity becomes so rough that a virtual folder which is difficult to use is created. In the case where the length of the character string is equal to or larger than the given value, the process proceeds to Step 905. In the case where the length of the character string is not equal to or larger than the given value, the process proceeds to Step 909.

In Step 905, the virtual folder creation program 122 determines whether or not the frequency of the selected keyword is equal to or higher than a given value. The virtual folder is created only by keywords having a frequency which is equal to or higher than the given value, whereby it is possible to suppress the creation of a meaningless virtual folder in which a small number of files are stored. In the case where the frequency is equal to or higher than the given value, the process proceeds to Step 906. In the case where the frequency is not equal to or higher than the given value, the process proceeds to Step 909.

In Step 906, the virtual folder creation program 122 determines whether or not the selected keyword includes a character string constituting the created parent folder. In the case where the selected keyword does not include the character string, the process proceeds to Step 907. In the case where the selected keyword includes the character string, the process proceeds to Step 909. For example, it is assumed that the keyword selected in Step 903 is "acceptance inspection notice letter" and "acceptance inspection" is included in the already-created parent folder. In this case, because "acceptance inspection notice letter" includes the character string of "acceptance inspection", the process proceeds to Step 909. The creation of similar parent folders can be prevented by performing this process. In this example, a parent folder named "acceptance inspection" is created, and a parent folder named "acceptance inspection notice letter" is not created. There is a possibility that a virtual folder named "acceptance inspection notice letter" is created in a process of Step 908 as a virtual folder in a hierarchical level lower than the parent folder named "acceptance inspection" (hereinafter, referred to as child folder in some cases).

In Step 907, the virtual folder creation program 122 registers the selected keyword into the virtual folder data 133 included in the storage apparatus 130.

In Step 908, the virtual folder creation program 122 creates a child folder. The detail of a child folder creation process will be described later with reference to FIG. 10.

In Step 909, the virtual folder creation program 122 determines whether or not all keywords have been processed. In the case where all the keywords have been processed, the process proceeds to Step 911. In the case where all the keywords have not been processed, the process proceeds to Step 910.

In Step 910, the virtual folder creation program 122 determines whether or not the number of parent folders reaches a prescribed value. In the case where the number of parent folders reaches the prescribed value, the process proceeds to Step 911. In the case where the number of parent folders does not reach the prescribed value, the process returns to Step 903.

In Step 911, the virtual folder creation program 122 determines whether or not all attributes to be processed have been processed. In the case where all the attributes to be processed have been processed, the virtual folder creation process is ended. In the case where all the attributes to be processed have not been processed, the process returns to Step 902.

FIG. 4 is a diagram illustrating an example of the virtual folder data 133 which is created by performing the virtual folder creation process. FIG. 4 illustrates the virtual folder of metadata whose attribute is the document type, in which a hierarchical level relation between parent folders and child folders and character strings are stored.

<Detail of Child Folder Creation Process>

Figure 10:
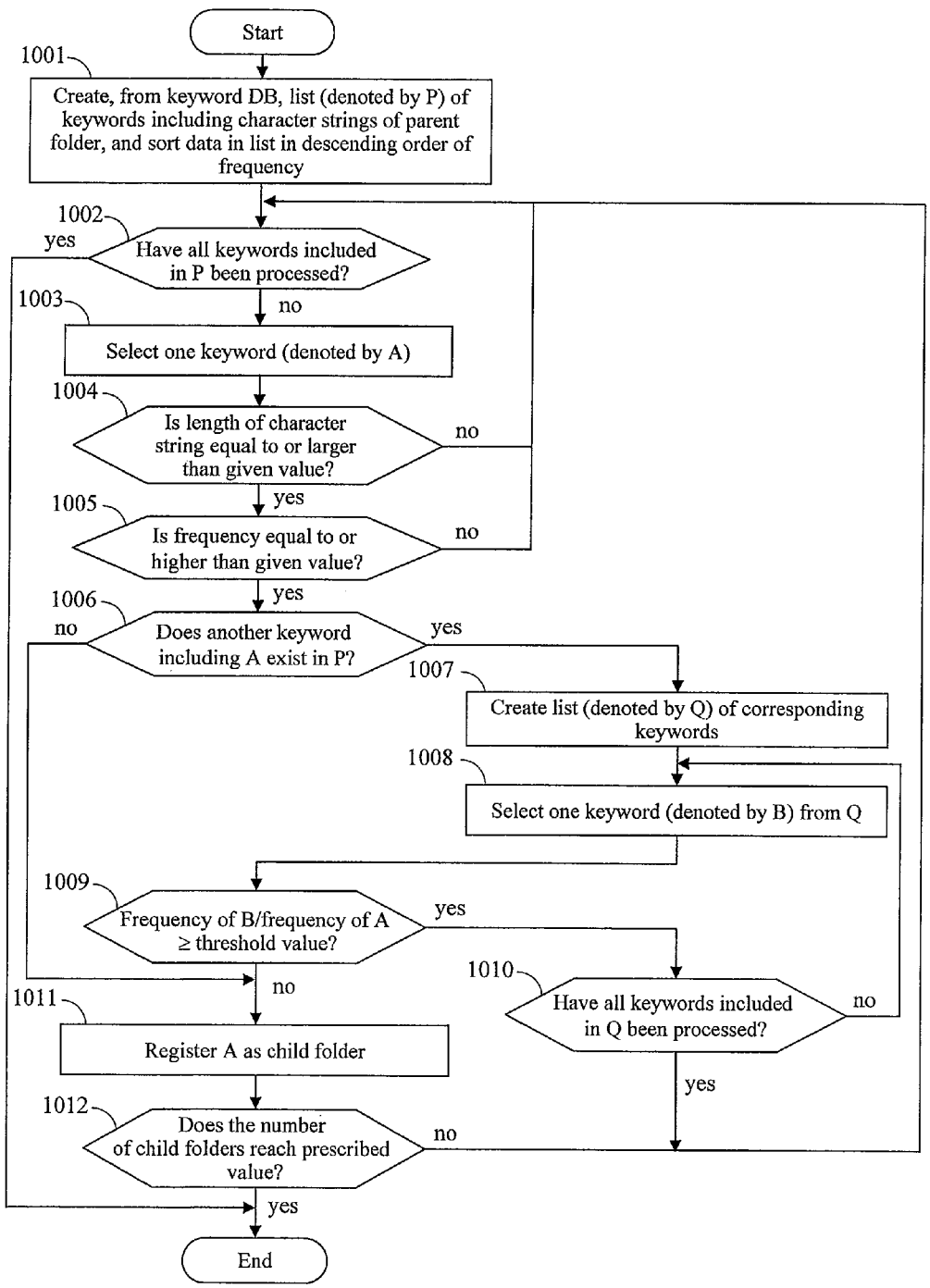
FIG. 10 is a flow chart for describing a child folder creation process.

FIG. 10 is a flow chart for describing the detail of the child folder creation process (Step 908). In the child folder creation process, a creation process for a child folder including a character string of a parent folder is performed.

In Step 1001, the virtual folder creation program 122 creates, from the keyword data 132, a list (hereinafter, denoted by P) of the keywords including the character strings of the parent folder which are created in Step 907 of FIG. 9, and sorts the data in the list in descending order of the frequency. In the case where the parent folder is named "acceptance inspection", P is formed of: the character strings including "acceptance inspection", such as "acceptance inspection letter", "acceptance inspection notice letter", and "acceptance inspection request letter"; and the frequencies thereof, and has the data which is sorted in accordance with the frequency. Similarly to the creation of the parent folder, a child folder is created in descending order of the frequency while the data is sorted in descending order of the frequency. At the time at which the number of child folders reaches a prescribed value, the process is ended. As a result, an unnecessary process can be omitted. In the following process, the child folder is created on the basis of the keywords included in P.

In Step 1002, the virtual folder creation program 122 determines whether or not all the keywords included in P have been processed. In the case where all the keywords have been processed, the child folder creation process is ended. In the case where all the keywords have not been processed, the process proceeds to Step 1003.

In Step 1003, the virtual folder creation program 122 selects one keyword (hereinafter, denoted by A (for example, acceptance inspection notice)) from the list P. In a process from Step 1004 to Step 1006, the virtual folder creation program 122 determines whether or not A is registered as the child folder.

In Step 1004, the virtual folder creation program 122 determines whether or not the length of the character string (A) is equal to or larger than a given value. In the case where the length is equal to or larger than the given value, the process proceeds to Step 1005. In the case where the length is not equal to or larger than the given value, the process returns to Step 1002. A threshold value of the length of the character string at this time is set in advance to a value larger than a threshold value of the length of the character string of the parent folder. This is because the child folder includes the character string of the parent folder and thus has a character string longer than that of the parent folder.

In Step 1005, the virtual folder creation program 122 determines whether or not the frequency of the selected keyword A is equal to or higher than a given value. In the case where the frequency is equal to or higher than the given value, the process proceeds to Step 1006. In the case where the frequency is not equal to or higher than the given value, the process returns to Step 1002. A threshold value of the frequency at this time is set in advance to a value smaller than a threshold value of the frequency of the keyword of the parent folder. This is because the child folder includes the character string of the parent folder and thus has an appearance frequency lower than that of the parent folder.

In a process from Step 1006 to Step 1010, a process for not creating unnecessary child folder is performed. For example, in the case where the list P includes keywords such as "acceptance inspection notice" and "acceptance inspection notice letter", the keywords having frequencies substantially equal to each other, one of the keywords having the character string which encompasses the character string of another one of the keywords, it is sufficient to register any one of the keywords as the child folder. In such a case, in the present embodiment, a keyword having the largest character string length is registered as the child folder. A specific process therefor is described below.

In Step 1006, the virtual folder creation program 122 determines whether or not a keyword including A exists in the list P. In the case where the keyword including A exists, the process proceeds to Step 1007. In the case where the keyword including A does not exist, the process proceeds to Step 1011. For example, in the case where A is "acceptance inspection notice" and "acceptance inspection notice letter" exists in the list P, A is included in P, so that the process proceeds to Step 1007.

In Step 1007, the virtual folder creation program 122 creates a list (hereinafter, denoted by list Q) of keywords including A in P. For example, the case is discussed in which "acceptance inspection notice", "acceptance inspection notice letter", and "acceptance inspection notice document" are registered in the list Q.

In Step 1008, the virtual folder creation program 122 selects, from the list Q, one keyword which is different from A. The selected keyword is denoted by B. It is assumed here that "acceptance inspection notice letter" is selected as B.

In Step 1009, the virtual folder creation program 122 determines whether or not a ratio of the frequency of B (acceptance inspection notice letter) to the frequency of A (acceptance inspection notice) is equal to or larger than a predetermined threshold value. In the case where the ratio is equal to or larger than the threshold value, it is regarded that a keyword having a frequency equivalent to that of A and a character string longer than that of A exists, and hence A is determined to be inappropriate for the child folder, so that the process proceeds to Step 1010. In the case where the ratio is not equal to or larger than the threshold value, the process proceeds to Step 1011. For example, in the case where the frequency of A (acceptance inspection notice) is 100, the frequency of B (acceptance inspection notice letter) is 98, and the threshold value is 0.9, the keyword having a frequency equivalent to that of A exists, and hence A is inappropriate for the child folder. If the keywords have frequencies equivalent to each other, the child folder is created so as to match the keyword having a larger character string length. This is because the longer character string is more specific and thus is suitable in terms of properties of the child folder.

In Step 1010, the virtual folder creation program 122 repeats a loop until all keywords included in Q are processed. In the case where all the keywords included in the list Q have not been processed, the process returns to Step 1008. On this occasion, the process proceeds with the keyword B being used as a new keyword A in Step 1003.

In Step 1011, the virtual folder creation program 122 registers A as the child folder into the virtual folder data 133 included in the storage apparatus 130 and advances the process to Step 1012.

In Step 1012, the virtual folder creation program 122 determines whether or not the number of registered child folders reaches a prescribed value. In the case where the number thereof reaches the prescribed value, the child folder creation process is ended, and the process proceeds to Step 909 in the flow chart of FIG. 9. In the case where the number thereof does not reach the prescribed value, the process returns to Step 1002.

It should be noted that, although only the process of creating the child folder is described in FIG. 10, a similar process may be executed also in the case of creating a grandchild folder, a great-grandchild folder ... which are associated with the child folder. That is, in the case of creating the grandchild folder, the process is executed with the child folder being regarded as corresponding to the parent folder in FIG. 10.

<Conclusion>

As has been described hereinabove, according to the present embodiment, a plurality of keywords are extracted by employing morphological analysis and the like, from character strings constituting metadata (particularly, each attribute information) of a plurality of physical files which are managed on a metadata file, and information on the appearance frequency of each of the extracted keywords is acquired. Then, a prescribed number of parent folders (virtual higher-level folders) are created by employing a keyword having an appearance frequency which is equal to or higher than a predetermined value, and child folders (virtual lower-level folders: a concept including not only the child folder but also a grandchild folder, a great-grandchild folder, and the like) which are associated with the respective parent folders are further created by employing another keyword including the keyword of names of the parent folders. In addition, the virtual classification display (FIG. 5), which displays a relation between the created parent folders and the created child folders and contents of the parent folders and the child folders, is displayed on a screen as a GUI. This facilitates automatic virtual classification of files and can efficiently realize file management using a virtual folder. It is generally considered that, in the case where a person creates a virtual folder, the virtual folder tends to be defined by a character string having a higher appearance frequency. Therefore, the present invention can be considered to perform processing suited to human thought, and hence classification close to a classification principle of a person is possible. In addition, the parent folders are created so as to encompass various character strings, and hence similar parent folders are less likely to be created, so that refined processing results can be obtained. Further, the child folders are created on the basis of a keyword which frequently appears in files included in the parent folders, and hence it is possible to efficiently retrieve a file even with finer granularity.

In addition, at the time of creating the parent folders, a keyword having a character string length which is equal to or larger than a predetermined value is employed. As a result, it becomes possible to prevent an excessively large number of parent folders from being created. This character string length can be designated by a user. Specifically, in the case where a number of virtual folders are created after the automatic virtual classification process, the number being different from the number expected by the user, this character string length can be changed.

In addition, a plurality of keywords are extracted for each attribute information of metadata, and information on the appearance frequency of each of the extracted keywords is acquired. Then, parent folders (virtual higher-level folders) and child folders (virtual lower-level folders) are created for each of the plurality of pieces of attribute information, and in response to a user's input of selecting an attribute, the virtual classification display (FIG. 5) corresponding to the selected attribute is outputted. As a result, the virtual folders are created for each attribute, and the virtual classification display which is unified so as to suit each user can be presented. Accordingly, such virtual classification display becomes extremely convenient for the user.

Further, at the time of creating the child folders (virtual lower-level folders), in the case where there exist more than one keywords having a ratio of the appearance frequency which falls within a predetermined range, among a plurality of keywords which include the keyword corresponding to names of the parent folders (virtual higher-level folders) and have a character string length larger than that of the keyword, a keyword having the largest character string length is employed as the folder name, to thereby create the child folders (virtual lower-level folders). As a result, it is possible to create the child folders whose folder characteristics are more specifically shown, and hence it becomes easier for a user to understand a tendency of file classification.

It should be noted that the present invention is not limited exactly to the disclosure in the embodiment and thus can be embodied by modifying constituent elements thereof within a range not departing from the gist thereof, at the time of carrying out the present invention. In addition, various inventions can be formed by combining as appropriate a plurality of constituent elements disclosed in the embodiment. For example, some constituent elements may be deleted from all the constituent elements disclosed in the embodiment. Further, constituent elements according to different embodiments may be combined as appropriate.

In addition, a part or entirety of the respective configurations, functions, processing units, processing sections, and the like which are described in the embodiment may be implemented by means of hardware, for example, by designing the same as an integrated circuit. Alternatively, the respective configurations, functions, and the like may be implemented by means of software, for example, by a processor interpreting and executing a program for implementing the respective functions. Information on the program, a table, a file, and the like for implementing the respective functions can be stored in a recording or storage apparatus such as a memory, a hard disk, and an SSD (Solid State Drive) or in a recording or storage medium such as an IC card, an SD card, and a DVD.

Further, in the above-mentioned embodiment, control lines and information lines which are considered to be necessary for description are described, but all control lines and information lines which are necessary for an actual product are not necessarily described. All elements may be connected to each other.

DESCRIPTION OF SYMBOLS

100 . . . central processing unit (processor)
110 . . . input/output apparatus
111 . . . display apparatus
112 . . . keyboard
113 . . . mouse
120 . . . program memory
121 . . . keyword registration program
122 . . . virtual folder creation program
123 . . . virtual classification program
130 . . . storage apparatus
131 . . . metadata file
132 . . . keyword data
133 . . . virtual folder data

What is claimed is:

1. A file management apparatus which classifies and manages a plurality of physical files, comprising:
a processor which executes a program which creates virtual folders for classifying the plurality of physical files; and
a storage apparatus which stores therein metadata management information for managing metadata of the plurality of physical files, wherein:
the virtual folders are for managing link information of the plurality of physical files and a plurality of physical folders, irrespective of locations at which ones of the plurality of physical files and the plurality of physical folders exist, the plurality of physical folders storing therein the physical files; and the processor is configured to:
extract a plurality of keywords from character strings constituting the metadata of the plurality of physical files of the metadata management information, and acquire information on an appearance frequency of each of the extracted keywords;
employ one or more keywords having the appearance frequency which is equal to or higher than a predetermined value, to thereby create a prescribed number of virtual higher-level folders;
employ one or more other keywords, which each include one of the keywords employed for creating the virtual higher-level folders, to thereby create virtual lower-level folders which are associated with the virtual higher-level folders, wherein each of the virtual lower-level folders created have a hierarchical relationship with each corresponding virtual higher-level folder, and each of the virtual lower-level folders has a name including the keyword of the corresponding virtual higher-level folder; and
output virtual classification display which displays a relation between the created virtual higher-level folders and the created virtual lower-level folders and contents of the virtual higher-level folders and the virtual lower-level folders.

2. The file management apparatus according to claim 1, wherein
the processor employs a keyword having a character string length which is equal to or larger than a predetermined value, among the extracted keywords, to thereby create the virtual higher-level folders.

3. The file management apparatus according to claim 1, wherein:
the metadata management information serves to manage a plurality of pieces of attribute information for each of the plurality of physical files; and
the processor extracts the plurality of keywords for each of the plurality of pieces of attribute information, and acquires the information on the appearance frequency of each of the extracted keywords.

4. The file management apparatus according to claim 3, wherein the processor creates the virtual higher-level folders and the virtual lower-level folders for each of the plurality of pieces of attribute information, and outputs, in response to a user's input of selecting an attribute, the virtual classification display corresponding to the selected attribute.

5. The file management apparatus according to claim 1, wherein
when the processor creates the virtual lower-level folders, in a case where there are more than one keywords having a ratio of the appearance frequency which falls within a predetermined range, among a plurality of keywords which include the keyword employed for creating the virtual higher-level folders and have a character string length larger than that of the keyword, the processor employs a keyword having a largest character string length as a folder name, to thereby create the virtual lower-level folders.

6. The file management apparatus according to claim 1, wherein
in a case where there are a plurality of other keywords including the keyword employed for creating the virtual higher-level folders, the processor employs a keyword having: a character string length which is equal to or larger than a predetermined value; and the appearance frequency which is equal to or higher than a predetermined value, to thereby create the virtual lower-level folders.

7. A file management method for classifying and managing a plurality of physical files, comprising the steps of:
reading, by a processor, metadata management information for managing metadata of the plurality of physical files, from a storage apparatus;
extracting, by the processor, a plurality of keywords from character strings constituting the metadata of the plurality of physical files of the metadata management information, and acquiring information on an appearance frequency of each of the extracted keywords;
employing, by the processor, one or more keywords having the appearance frequency which is equal to or higher than a predetermined value, to thereby create a prescribed number of virtual higher-level folders;
employing, by the processor, one or more other keywords, each including one of the keywords employed for creating the virtual higher-level folders, to thereby create virtual lower-level folders which are associated with the virtual higher-level folders, wherein the virtual lower-level folders are created so that each of the virtual lower-level folders has a hierarchical relationship with each corresponding virtual higher-level folder, and each of the virtual lower-level folders has a name including the keyword of the corresponding virtual higher-level folder; and
outputting, by the processor, virtual classification display which displays a relation between the created virtual higher-level folders and the created virtual lower-level folders and contents of the virtual higher-level folders and the virtual lower-level folders, wherein
the virtual folders are for managing link information of the plurality of physical files and a plurality of physical folders, irrespective of locations at which ones of the plurality of physical files and the plurality of physical folders exist, the plurality of physical folders storing therein the physical files.

8. The file management method according to claim 7, wherein
the step of creating a prescribed number of virtual higher-level folders includes employing, by the processor, a keyword having a character string length which is equal to or larger than a predetermined value, among the extracted keywords, to thereby create the virtual higher-level folders.

9. The file management method according to claim 7, wherein:
the metadata management information serves to manage a plurality of pieces of attribute information for each of the plurality of physical files; and
the step of acquiring information on an appearance frequency of each of the extracted keywords includes extracting, by the processor, the plurality of keywords for each of the plurality of pieces of attribute information, and acquiring the information on the appearance frequency of each of the extracted keywords.

10. The file management method according to claim 9, wherein:
the step of creating virtual lower-level folders includes creating, by the processor, the virtual higher-level folders and the virtual lower-level folders for each of the plurality of pieces of attribute information; and
the step of outputting virtual classification display includes outputting, by the processor, in response to a user's input of selecting an attribute, the virtual classification display corresponding to the selected attribute.

11. The file management method according to claim 7, wherein
the step of creating virtual lower-level folders includes employing, by the processor, when the processor creates the virtual lower-level folders, in a case where there exist more than one keywords having a ratio of the appearance frequency which falls within a predetermined range, among a plurality of keywords which include the keyword employed for creating the virtual higher-level folders and have a character string length larger than that of the keyword, a keyword having a largest character string length as a folder name, to thereby create the virtual lower-level folders.

12. The file management method according to claim 7, wherein
the step of creating virtual lower-level folders includes employing, by the processor, in a case where there exist a plurality of other keywords including the keyword employed for creating the virtual higher-level folders, a keyword having: a character string length which is equal to or larger than a predetermined value; and the appearance frequency which is equal to or higher than a predetermined value, to thereby create the virtual lower-level folders.

* * * * *